J. F. L. UHL.
CASTER WHEEL.
APPLICATION FILED JULY 20, 1908.
915,909.
Patented Mar. 23, 1909.
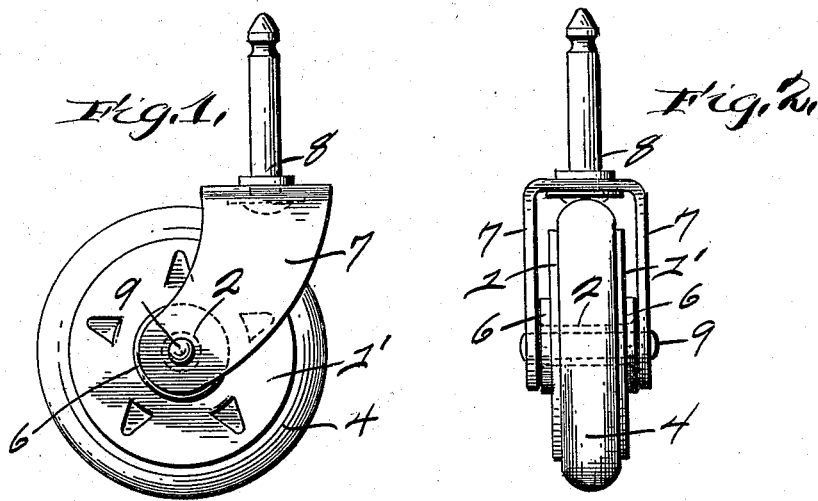
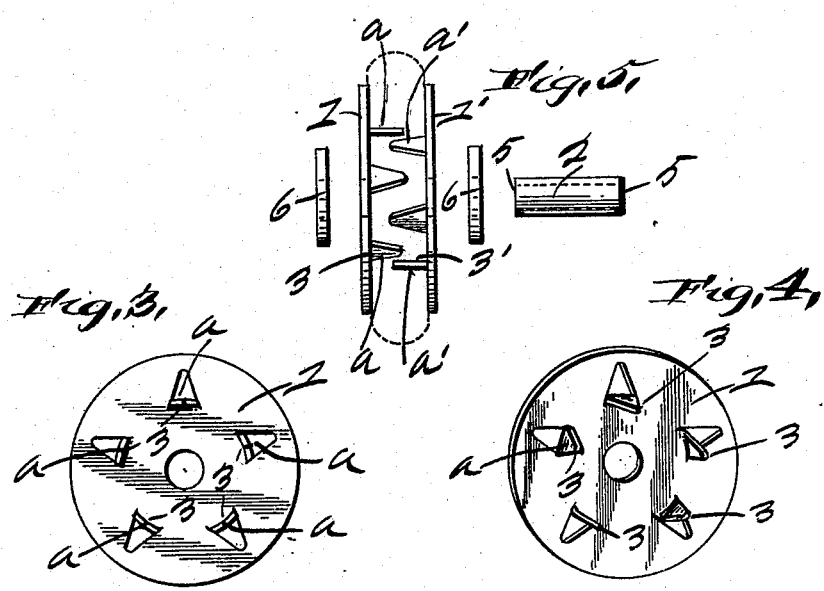
Witnesses,
A. J. Barton
J. H. Smythe
Inventor,
J. F. L. Uhl
By Carl H. Keller
atty.
THE NORRIS PETERS CO., WASHINGTON, D. C.

UNITED STATES PATENT OFFICE.

JOSEPH F. L. UHL, OF TOLEDO, OHIO.

CASTER-WHEEL.

No. 915,909.  Specification of Letters Patent.  Patented March 23, 1909.

Application filed July 20, 1908. Serial No. 444,500.

*To all whom it may concern:*

Be it known that I, JOSEPH F. L. UHL, a citizen of the United States, residing at Toledo, in the county of Lucas and State of Ohio, have invented certain new and useful Improvements in Caster-Wheels; and I do hereby declare the following to be a full, clear, and exact description of the invention, such as will enable others skilled in the art to which it appertains to make and use the same.

This invention relates to improvements in caster wheels adapted especially for use on typewriter and adding-machine stands, and it has for its object to provide in a caster wheel improved means for mounting the rim or tread of the wheel to hold the same from pressure against the center bearing of the wheel.

In constructing my improved caster wheel I employ a leather or compressed wood fiber body the outer margin of which forms the tread, it being found that rubber is wholly unsuited for this purpose as the same becomes flattened and out of shape in use.

In the accompanying drawings Figure 1 is a side elevation of a caster wheel embodying my improvement, the same being mounted upon a bracket of ordinary construction; Fig. 2 is a front elevation of the same; Fig. 3 is a face view of one of the sheet steel plates adapted to clamp the body of the wheel between them, the inwardly deflected pointed portions being shown thereon; Fig. 4 is a perspective view of the same plate; and Fig. 5 is a view of the metal parts of the caster wheel, the same being shown prior to assembling.

Referring to the drawings, the caster wheel comprises two like perforated sheet steel disks 1 and 1' connected by a central bearing sleeve 2 and having pointed triangular-shaped portions 3 and 3' struck from the body of the disks near their outer margins at equal angular distances, and these pointed portions in the operation of forming the disks by means of suitable dies are deflected so as to project inwardly perpendicular to the body of the disks and present flat bearing faces $a$ and $a'$, the disks 3 and 3' being assembled in parallel relation to cause the faces $a$ and $a'$ to assume alternate positions, as shown in Fig. 5.

The body 4 of the caster wheel the outer margin of which constitutes the tread of the wheel, is made of leather, wood-pulp composition, or analogous tough material, and is secured between the disks 1 and 1' by forcibly pressing the disks toward each other by means of a suitable press, the deflected portions being disposed alternately as in Fig. 5, the inwardly pointed ends of the deflected portions being forced into the body 4 which is interposed between them. When thus assembled the ends 5 of the bearing sleeve 2 which extends centrally through the disks and the body, is upset to maintain the disks and the body in firm assembled relation, there being also washers 6 held in firm contact with the outer faces of the disks by the upset ends of the bearing sleeve, the washers serving to hold the sides of the wheel from contact with the arms 7 of the bracket 8 which carries the bearing spindle 9 upon which the sleeve of the caster wheel is mounted for rotation. It is thus seen that the tread or outer margin of the body 4 is firmly supported by the flat faces presented by the deflected portions 3 and 3', and since these deflected portions are arranged alternately in assembling the caster wheel, there is an almost continuous annular bearing portion for the tread upon which the strain is directed when the wheel is in use, the center bearing sleeve being practically free from pressure of the body 4 thereon.

Having described my invention, what I claim and desire to secure by Letters Patent, is—

A caster wheel consisting of a body of tough, fibrous, inelastic material the outer margin of which constitutes the tread, and a pair of sheet metal disks on opposite sides of the body having portions struck therefrom within the margin and deflected inwardly to enter the body and present flat expanded faces to support the tread, the deflected portions being arranged alternately relative to each other, substantially as described.

In testimony whereof, I hereunto affix my signature, in presence of two witnesses.

JOSEPH F. L. UHL.

Witnesses:
CARL H. KELLER,
GRANT WILLIAMS.